(No Model.)
S. E. OVIATT.
THRASHING MACHINE.
No. 277,055. Patented May 8, 1883.
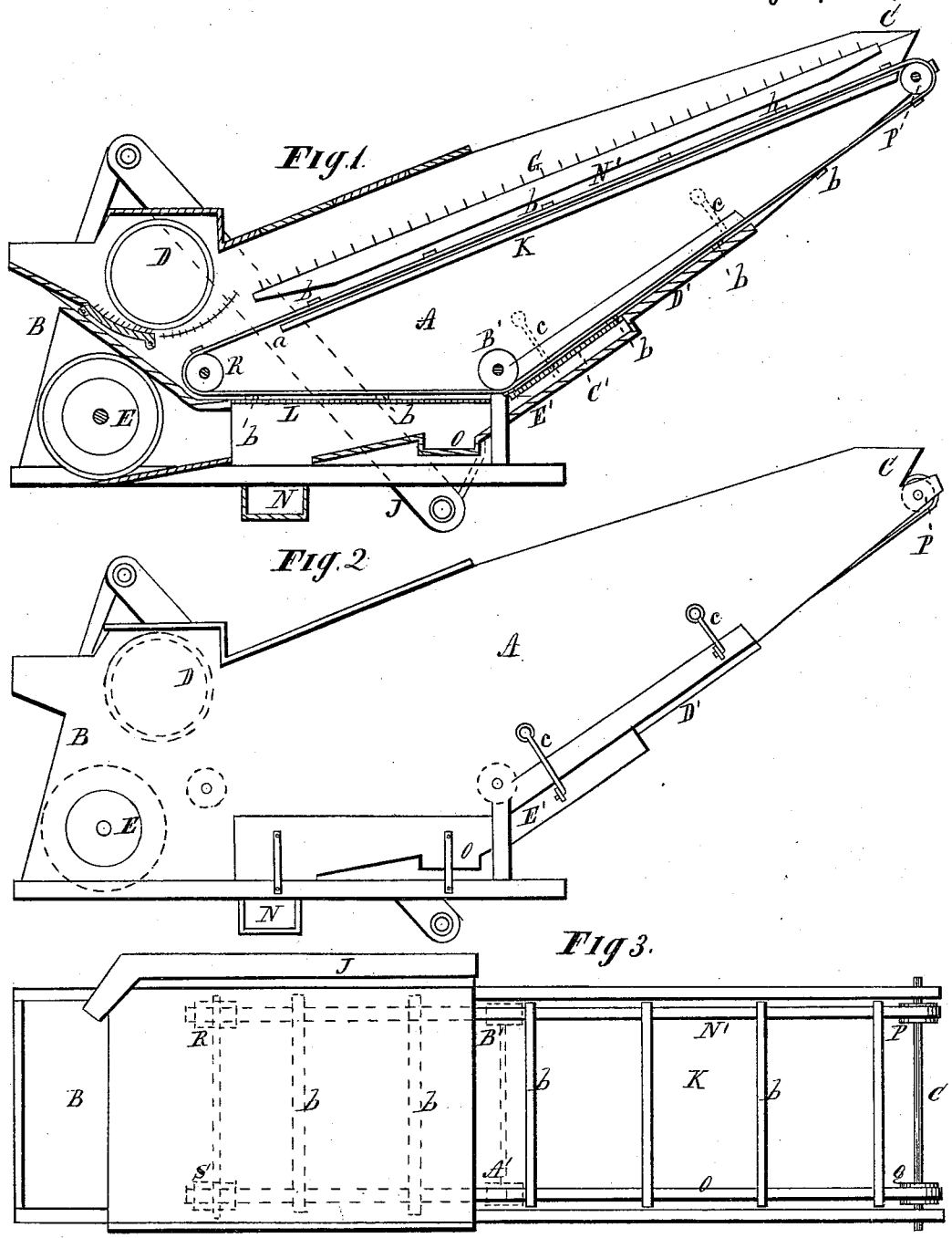
Witnesses
J. W. Burridge
[signature]
Inventor.
S. E. Oviatt
W. H. Burridge
Atty.

UNITED STATES PATENT OFFICE.

SOLOMON E. OVIATT, OF WILLOUGHBY, OHIO.

THRASHING-MACHINE.

SPECIFICATION forming part of Letters Patent No. 277,055, dated May 8, 1883.

Application filed May 1, 1882. (No model.)

*To all whom it may concern:*

Be it known that I, SOLOMON E. OVIATT, of Willoughby, in the county of Lake and State of Ohio, have invented a certain new and Improved Thrashing-Machine; and I do hereby declare that the following is a full, clear, and complete description thereof.

A full and complete description of the said improvement is as follows. For illustration, reference will be had to the accompanying drawings, making a part of this specification, in which—

Figure 1 represents a vertical longitudinal section of the machine. Fig. 2 is a side elevation, and Fig. 3 is a plan view.

The same letters of reference refer to the same or corresponding parts in the several views.

The improved machine in its general structure and operation is not unlike thrashing-machines now in use and well understood by the trade; hence a detailed description of the construction of the machine will not be given in this place, and only so much of the machine is shown in the drawings as will show the application thereto of the new part. A brief description of the prominent parts of the machine is as follows:

A represents the body of the machine; B, the front end thereof; C, the tail end; D, the thrashing-cylinder; E, the blower or fan; G, the endless apron or carrier on which the straw is conveyed away from the cylinder; O, the tailing box or spout; N, the grain-box, and J the elevator for returning the uncleaned grain back to the cylinder from the tailing-spout, all of which is substantially the same as in the ordinary thrashing-machine.

In ordinary thrashing-machines the straw, chaff, and grain are carried to the rear end thereof, where the straw is thrown onto the stack or onto a stacker, while the grain, chaff, and litter fall onto the sieves in the rear of the machine, where the grain is separated from the chaff and litter. More or less of the grain passes at once to the measure, and portions of it to the elevator, to be again run through the machine for further cleaning. The rest of the grain, or that not separated from the chaff and litter, is thrown therewith onto the stack and wasted. More especially is this the case when the straw is damp, which clogs the sieves and prevents the grain from sifting through. To avoid this clogging of the sieves and consequent wasting of the grain is the purpose of the above-said improvement, which consists of a supplementary carrier. Said carrier is composed of two endless belts, N and O, Fig. 3, connected to each other by the bars $b$. Said belts are arranged to run, respectively, over the pulleys P Q at the rear or tail end of the machine and over a corresponding pair of pulleys, R S, at the lower or front end. One of the pulleys only can be seen in Fig. 1, both of which, however, are indicated by the dotted lines R S in Fig. 3.

It will be observed on examination of Fig. 1 that the carrier on passing around the two lower pulleys, R and S, travels in a horizontal direction over the sieve L to a pair of pulleys, A' and B', (corresponding to the pulleys P and Q,) from thence to the said pulleys P Q. It will also be observed that the supplementary carrier lies upon the floor K and below the main straw-carrier G, and that the cross-bars $b$ sweep the sieve L, and also the tail-board sieve C', immediately below the tail-board D'. The tail-board and sieve are in alignment, one with the other, and both are secured to the body of the machine by hooks $c$.

The practical operation of the supplementary carrier in combination with the main straw-carrier is as follows: The unthrashed grain is fed to the machine in the ordinary way. As the straw leaves the cylinder D it is conveyed by the carrier G to the tail of the machine, and is dropped therefrom onto the stack or on an elevator for being carried still farther away from the machine. A portion of the thrashed grain falls at once from the cylinder onto the sieve L and through into the grain-box N, while the remaining grain is separated from the straw as it is being carried back by the main carrier G, and falls therefrom with more or less litter onto the floor K, down which it is swept onto the sieve L by the supplementary carrier, through which the grain sifts into said grain-box N, while the chaff, &c., is swept by the joint action of the blower and the supplementary carrier over and from the sieve L to the tail-board, while the tailings fall through the tailing-sieve C' to the floor E', and pass therefrom down to the tailings-box and elevator, to be again run through the machine for saving what good grain there may be in it.

From the above it will be obvious there can be no clogging up of the sieves, as the downward positive movement of the supplementary carrier sweeps the grain and chaff and litter from the floor K onto the sieve L, through which the grain falls into the grain-box, while the litter is swept on and over the tail-screens, through which the grain, if there be any left in the litter, falls to the tailings-box and the litter onto the stack, thereby obviating the necessity of a strong blast of wind, which is liable to lift the grain with the litter, thus throwing both out of the machine. This is very liable to occur in the use of the ordinary thrashing-machines, especially if the litter, &c., is damp and weedy. However, by the supplementary carrier the litter would be agitated, allowing the grain to sift out and the chaff and dirt be blown away with a comparatively light wind conjointly with the operation of the supplementary carrier.

What I claim as my invention, and desire to secure by Letters Patent, is—

1. In a thrashing-machine, in combination with the carrier G, the supplementary carrier N', inclined grain-floor K immediately below said carrier N', horizontal sieves L, tail-board, and sieve, substantially as described, and for the purpose specified.

2. In a machine for thrashing grain, the combination of the carrier G, supplementary carrier N', inclined grain-floor and sieves swept by said supplementary carrier, and extension tail-board and sieve, constructed and arranged to operate in the manner as described, and for the purpose specified.

In testimony whereof I affix my signature in presence of two witnesses.

SOLOMON E. OVIATT.

Witnesses:
W. H. BURRIDGE,
J. H. BURRIDGE.